US012723439B2

(12) United States Patent
Weiershausen

(10) Patent No.: US 12,723,439 B2
(45) Date of Patent: Sep. 1, 2026

(54) PORTABLE HOOP LOCK

(71) Applicant: ABUS August Bremicker Söhne KG, Wetter-Volmarstein (DE)

(72) Inventor: Bernd Weiershausen, Rehe (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 30 days.

(21) Appl. No.: 18/915,423

(22) Filed: Oct. 15, 2024

(65) Prior Publication Data

US 2025/0129640 A1 Apr. 24, 2025

(30) Foreign Application Priority Data

Oct. 23, 2023 (DE) ......................... 102023129106.8

(51) Int. Cl.

*E05B 67/02* (2006.01)
*E05B 47/00* (2006.01)
*E05B 67/22* (2006.01)

(52) U.S. Cl.

CPC .......... *E05B 67/02* (2013.01); *E05B 47/0012* (2013.01); *E05B 67/22* (2013.01); *E05B 2047/0058* (2013.01)

(58) Field of Classification Search

CPC .......... E05B 67/02; E05B 67/38; E05B 67/04; E05B 17/002; E05B 2067/386; E05B 67/22; E05B 67/383; E05B 73/00; E05B 47/0012

See application file for complete search history.

(56) References Cited

U.S. PATENT DOCUMENTS 3,712,091 A * 1/1973 Parent ................. E05B 19/0005 70/63
3,979,932 A * 9/1976 Piche .................. E05B 19/0005 70/26
4,134,280 A * 1/1979 Pelavin ................... E05B 67/02 70/55
5,046,339 A * 9/1991 Krell ....................... E05B 67/02 206/523
5,156,029 A * 10/1992 Heald ..................... E05B 67/02 411/512

(Continued)

FOREIGN PATENT DOCUMENTS

AU 2024200027 A1 * 8/2024 ............. E05B 15/00
CN 112360248 A 2/2021

(Continued)

*Primary Examiner* — Christine M Mills
*Assistant Examiner* — Faria F Ahmad
(74) *Attorney, Agent, or Firm* — Dickinson Wright PLLC

(57) ABSTRACT

A portable hoop lock comprises a lock body, a lock hoop and an electromechanical locking mechanism that is configured to selectively lock the lock hoop. An energy source of the locking mechanism is arranged in a housing that has a replacement opening through which the energy source can be introduced and removed. The hoop lock comprises a cover that can be plugged onto the housing to close the replacement opening, wherein the housing or the cover has at least one elastically deformable sealing section that forms a peripheral elevated portion at a side wall of the housing or the cover and that can be compressed between the cover and the housing and/or elastically deformed by the plugging on of the cover.

20 Claims, 6 Drawing Sheets

(56) References Cited

U.S. PATENT DOCUMENTS 6,046,558 A * 4/2000 Larson ............... G07C 9/00896
318/281
6,047,575 A * 4/2000 Larson ................ E05B 47/0012
70/38 A
6,337,618 B1 * 1/2002 Craig ...................... E05B 67/22
340/5.22
6,401,501 B1 * 6/2002 Kajuch ................... E05B 67/22
63/38
6,442,983 B1 * 9/2002 Thomas .............. E05B 47/0012
70/278.1
6,705,134 B2 * 3/2004 Miranda ................. E05B 67/38
70/52
6,898,952 B1 * 5/2005 Lin ..................... E05B 47/0012
70/52
8,596,103 B2 * 12/2013 Weiershausen ....... E05B 37/025
70/315
8,779,933 B2 * 7/2014 Hartmann ............. E05B 45/005
70/38 A
10,309,128 B2 * 6/2019 Horton .................... E05B 67/38
10,422,163 B1 * 9/2019 Cabral Herrera ....... E05B 67/22
11,028,618 B1 * 6/2021 Liu ......................... E05B 67/22
11,352,817 B2 * 6/2022 Gengler ............. G07C 9/00944
11,499,346 B2 * 11/2022 Martínez ................. E05B 67/24
12,196,003 B2 * 1/2025 Millikin .............. E05B 47/0012
12,281,499 B2 * 4/2025 Kuchler ................. B62H 5/003
12,480,333 B2 * 11/2025 Fisher ................ G07C 9/00571
2004/0055342 A1 * 3/2004 Chen ..................... E05B 17/002
70/56
2005/0207087 A1 * 9/2005 Fisher .................. G07C 9/0069
361/160
2006/0137413 A1 * 6/2006 Yu ......................... E05B 37/025
70/63
2006/0283216 A1 * 12/2006 Marcelle ............ G07C 9/00182
70/38 A
2008/0229792 A1 * 9/2008 Maple ................... G09F 3/0358
292/307 R
2009/0095036 A1 * 4/2009 Ng ........................ E05B 37/025
70/63
2012/0011902 A1 * 1/2012 Meekma ................. E05B 47/06
70/52
2015/0225986 A1 * 8/2015 Goldman .............. E05B 17/002
70/20
2015/0292244 A1 * 10/2015 Beatty ................. E05B 47/0012
70/20
2018/0165901 A1 * 6/2018 Lai .......................... E05B 67/24
2019/0323268 A1 * 10/2019 Fan ......................... E05B 67/24
2023/0366238 A1 * 11/2023 Mao .................... E05B 47/0012
2024/0240495 A1 * 7/2024 Weiershausen ....... E05B 67/063
2025/0172017 A1 * 5/2025 Lien ......................... E05B 67/38
2025/0361748 A1 * 11/2025 Wehr .................. E05B 47/0012

FOREIGN PATENT DOCUMENTS

CN 215565161 U 1/2022
CN 219497974 U 8/2023
CN 118167133 A * 6/2024 ......... E05B 47/0012
DE 102018111302 A1 11/2019
DE 102020116009 A1 * 12/2021 ............. E05B 67/22
JP 2006316614 A * 11/2006 ............. E05B 67/02
WO WO-2010105374 A1 * 9/2010 ............. E05B 67/22
WO WO-2019200554 A1 * 10/2019 ............. E05B 67/22
WO 2020154738 A2 7/2020

* cited by examiner

PORTABLE HOOP LOCK

CROSS-REFERENCE TO RELATED APPLICATION

This application claims the benefit and priority of German Patent Application No. 102023129106.8 filed on Oct. 23, 2023. The entire disclosure of the above application is incorporated herein by reference.

FIELD OF THE INVENTION

The invention relates to a portable hoop lock and in particular to a padlock for securing a switch or a detent of an industrial system that may, for example, be used as a so-called lockout padlock. The hoop lock comprises a lock body and a lock hoop that may be selectively introduced into the lock body or at least partly detached from the lock body. The lock body comprises an electromechanical locking mechanism that is configured to selectively lock the lock hoop introduced into the lock body against a detachment from the lock body or to release the lock hoop for the detachment from the lock body. For this purpose, the electromechanical locking mechanism comprises an electric motor, at least one latch element drivable by the electric motor and an energy source, in particular a battery, for supplying the electric motor with electrical energy.

BACKGROUND OF THE INVENTION

Hoop locks may generally be used in a variety of applications for selectively blocking or releasing access to objects or rooms and may, for example, have a rigid or flexible hoop that may be selectively locked to a lock body or released for a detachment from the lock body. For example, a hoop lock may be used to lock a locker by guiding the lock hoop through an eyelet of a hasp of the locker and then locking it to the lock body in order to secure objects stored in the locker against being accessed. Hoop locks may further be used, for example, to connect a frame section of a two-wheeler to a stationary object and thereby to secure the two-wheeler against an unauthorized riding away.

However, a special area of application for hoop locks configured as padlocks is in the field of occupational safety. There is the risk in connection with the servicing of industrial systems, for example of a production machine, that the industrial system deactivated for the purpose of servicing work is accidentally activated again while the servicing work is still continuing. This may result in a substantial danger for the maintenance personnel. It is therefore customary that the maintenance personnel moves a switch associated with the industrial system or a detent, for example of a fluid line, to an OFF position for the duration of the servicing work and secures it in this position, i.e. the switch or the detent is directly blocked or access to the switch or the detent is blocked. Said switch is typically an energy supply switch, for example, an electrical master switch of a control device or of an energy supply device of the industrial system (e.g. a power switchbox). Alternatively thereto, said switch or said detent may, for example, be a valve of a liquid line or gas line.

To effectively avoid an accidental activation of the industrial system by another person, each service engineer hangs a padlock on said switch or said detent before starting his work and locks said padlock. Such a padlock may in particular have a rigid or flexible and/or essentially U-shaped hoop that may be locked to the lock body of the padlock to lock the padlock. The switch (e.g. electrical switch) or the detent (e.g. of a fluid line) is hereby secured in the OFF position and cannot be accidentally moved back to an ON position by another person. When the service engineer has ended his work, he unlocks the padlock again and releases it from the switch or the detent. Each service engineer is usually assigned his own individual padlock (or a plurality of his own individual padlocks).

This procedure is also called a lockout. The padlock used is accordingly called a lockout lock. The document U.S. Pat. No. 5,449,867 shows such a securing of an electric rocker switch by means of a padlock. It is known from the document U.S. Pat. No. 3,171,908 to secure the position of a rotary switch by means of a padlock.

So that a plurality of service engineers may block and release the switch or the detent again independently of one another, a plurality of receivers (e.g. eyelets) may be provided at the switch or the detent for hanging in a plurality of lockout locks. This is known from the document U.S. Pat. No. 6,388,213, for example. If only a single receiver is provided for a lockout lock, a securing claw may be used that is hung into the respective eyelet of the switch or of the associated detent and that in turn has a plurality of hang-in eyelets for a respective padlock. The securing claw may only be removed once the last padlock has been removed from the securing claw so that the switch or the detent may be brought into the ON position again. Such a securing claw for use at an electric switchbox is known, for example, from the documents U.S. Pat. Nos. 6,396,008; 5,365,757 and 3,667,259.

For example, such lockout padlocks may be configured as electronic hoop locks with an electromechanical locking mechanism to enable an easy operability when opening the padlock after a service. For this purpose, the padlock may, for example after a service has taken place, be opened by transmitting an opening code from a smartphone so that the authorized service engineer only has to carry the smartphone with him, which is often taken along anyway, but not a separate mechanical key for the padlock to be able to open the padlock. Such an option for controlling the lock is in particular advantageous for lockout padlocks since a service engineer sometimes has to lock a plurality of switches or detents with respective lockout padlocks and to open all lockout padlocks again after a service has taken place so that a separate key may be required for each of the padlocks if the padlocks are designed purely mechanically. Electronic hoop locks, on the other hand, may all be controllable by a suitable application (app) on a smartphone, for example. Such a simple controllability may also be desired and/or advantageous for hoop locks used for other applications.

While such electronic hoop locks thus in particular enable a simplified unlocking of a hoop lock, for example after a service of an industrial system has taken place, in order to release a switch or a detent, there is generally the problem when using electronic hoop locks that an actuation may only take place with a sufficiently charged energy source. It is therefore necessary to be able to replace the energy source, if necessary, to be able to replace an exhausted energy source and continue using the hoop lock.

In this regard, the energy source of an electronic hoop lock must be accessible from the outside so that an opening is required in a housing of the hoop lock through which an exhausted energy source may be removed to then be able to insert a new charged energy source into the housing. At the same time, however, it is necessary to protect the energy source from damage by incoming liquid so that the required opening must be reliably sealed. Again, this is in particular important in the area of occupational safety, for example, to prevent damage to the energy source or an escape of battery acid when using the hoop lock to block a gas line.

To seal the required opening, it is usually provided to close the opening by a screwed-on cover and, for example, to clamp a sealing ring between the cover and the housing in order, as a result, in particular to prevent a liquid exchange between an inner space of the housing and the external environment of the padlock. Although a good sealing may thereby usually be achieved, changing the energy source is undesirably time-consuming since a tool suitable for releasing the fastening device, such as a screwdriver, is always required to remove the cover, which may lead to undesirable delays if a hoop lock with an exhausted energy source is to be unlocked promptly, but the required tool must first be procured.

SUMMARY OF THE INVENTION

It is therefore an object of the invention to provide a portable hoop lock that comprises an electromechanical locking mechanism and that enables a reliable sealing of a housing for receiving an energy source of the electromechanical locking mechanism and simultaneously enables a replacement of an exhausted energy source with a new energy source that may be performed simply and quickly.

This object is satisfied by a portable hoop lock having the features of claim 1.

The energy source of the hoop lock is arranged in a housing that has a replacement opening through which the energy source may be introduced into the housing and removed from the housing. The hoop lock furthermore has a cover that may be plugged onto the housing along a plug-on direction to close the replacement opening. The housing or the cover further has at least one elastically deformable sealing section that forms an elevated portion at a side wall of the housing or the cover, wherein the elevated portion extends peripherally around the sidewall. The sealing section may be compressed between the cover and the housing and/or may be elastically deformed along the plug-on direction by plugging the cover onto the housing for sealing the replacement opening.

The hoop lock thus has the necessary opening in the form of the housing opening to enable an exhausted energy source, in particular a depleted battery, to be changed. However, a cover is furthermore provided to close the housing opening, in particular during regular use of the hoop lock. Since the at least one sealing section may be compressed between the cover and the housing and/or elastically deformed by plugging on the cover, the sealing section may close a gap between the housing and the cover in a sealing manner in order thereby to protect the energy source arranged in the housing from an entry of liquid and/or dust. In particular, since the compression and/or elastic deformation takes place by plugging the cover onto the housing, the desired sealing may already be achieved immediately after plugging on the cover so that any fastening devices for establishing the sealing may be omitted. Conversely, the cover may accordingly also be removable directly from the housing to replace a used or exhausted energy source without first having to procure a suitable tool.

Since the sealing section forms an elevated portion extending peripherally around a side wall of the housing or the cover, the sealing section may in particular extend in a peripheral direction at or along the side wall of the housing or the cover with respect to the plug-on direction. In other words, since the sealing section forms an elevated portion extending peripherally around a side wall of the housing or the cover, the deformable sealing section may form a peripheral elevated portion at a side wall of the housing of the cover. Furthermore, the at least one sealing section may in particular be arranged between a side wall of the cover and a side wall of the housing when the cover is plugged on. The housing or the cover may thus have at least one sealing section that is not arranged axially between or at respective end faces of the cover and the housing with respect to the plug-on direction, but rather between respective side walls of the housing and the cover. For example, a sealing section arranged at a side wall of the housing may rise inwardly, starting from the side wall, into an inner space of the housing in order, by introducing a section of the cover into the inner space, to be elastically deformed and, for example, to be displaced along the plug-on direction and/or compressed transversely to the plug-on direction. The sealing section may hereby exert a force directed opposite to the elastic deformation on the introduced section of the cover to seal the inner space of the housing.

Alternatively thereto, it may, for example, also be provided that the sealing section extends peripherally around an outer wall of a section of the cover that may be introduced into an inner space of the housing in order, during the introduction of the outer wall of the cover into the inner space of the housing, to be compressed or to be displaced against the plug-on direction, and thus to be elastically deformed along the plug-on direction. A sealing of the inner space of the housing may hereby also be directly achieved.

Furthermore, it is possible, for example, that the sealing section is peripherally arranged at an outer side of the housing facing away from an inner space of the housing, in which the energy source is arranged, in order to cooperate with an inner side wall of a cover that may be plugged onto the outside of the housing, and thereby to seal the inner space of the housing. It may also be provided that, with such a cover that may be plugged onto the outside of the housing, the sealing section is formed at a side wall or inner wall of the cover facing the housing in order to achieve the desired sealing.

In particular, it may generally be provided that the sealing section is arranged such that the sealing section is contacted in the course of the plugging of the cover onto the housing by a side wall of that element (housing or cover) which does not have the sealing section, and is thereby compressed and/or elastically deformed to achieve a sealing between the side wall having the sealing section and the opposite side wall of the respective other element. Viewed the other way round, a side wall of that element which does not have the sealing section may in particular extend into a movement path of the sealing section which the sealing section describes relative to the element that does not have the sealing section when the cover is plugged onto the housing.

In particular, the design of the housing or the cover with a peripheral sealing section at a side wall thus enables a sealing between respective side walls of the housing and the cover so that the sealing is in particular achieved by a force oriented transversely to the plug-on direction between the sealing section and a side wall of the element that does not have the sealing section. Since the sealing is thus not achieved by a force acting along the plug-on direction, it is not necessary—unlike with conventional solutions—to generate a force along the plug-on direction between the cover and the housing that is sufficient for deforming a sealing element arranged in the plug-on direction between the cover and the housing. Therefore, with the hoop lock disclosed herein, fastening devices may in particular be omitted that, in conventional solutions, fix the cover axially to the housing with respect to the plug-on direction and generate the axial force required for sealing the housing. In this regard, the hoop lock disclosed herein enables a reliable sealing of the housing provided for the energy source or of the replacement opening required for replacing the energy source, wherein the cover, however, merely has to be plugged onto the housing for this purpose and does not have to be secured thereto, and for example screwed thereto, by a separate fastening device.

Therefore, in some embodiments, the cover may also be releasable from the housing in a simple manner and in particular without tools and/or may be directly removable from the housing without further dismantling steps to be able to replace the energy source. However, the compression and/or elastic deformation of the sealing section—in addition to the sealing of the housing—may axially secure the cover against an unintentional release from the housing against the plug-on direction since the static friction to be overcome between the sealing section and a side wall of that element which does not have the sealing section may prevent an unintentional release of the cover from the housing.

Even though access to the energy source may thus be possible directly and without tools, this does not result in a security disadvantage, in particular when using the hoop lock as a lockout padlock, since hoop locks or padlocks used in this way do not serve as theft protection or break-open protection anyway, but are merely intended to prevent an unintentional actuation of a switch and a detent during a servicing process. However, it is important with such an application to reliably seal the housing and, if necessary, to be able to change the energy source quickly and easily in order, for instance after a servicing has taken place and if an energy source is exhausted, not to first have to look for or even always carry along suitable tools to be able to change the energy source and then open the hoop lock. Therefore, the hoop lock disclosed herein is in particular suitable as a lockout padlock and may accordingly in particular be configured as a padlock and/or lockout padlock. Nevertheless, it may, however, also be provided in some embodiments, and in particular for hoop locks provided for other applications, to secure the cover to the housing using an additional fastening device in order to make an unauthorized access to the energy source more difficult.

In general, the hoop lock may, for example, be configured as a padlock and may have a rigid, substantially U-shaped U-hoop. Such a U-hoop may have two limbs that may be introduced into the lock body, wherein it may be provided that a relatively longer limb always remains in the lock body and only a relatively smaller limb of the U-hoop is detachable from the lock body to be able to be pivoted about the relatively longer limb in the detached state, for example. However, it may also be provided that both (equally long or differently long) limbs of a padlock are detachable from its lock body. However, alternatively thereto, the hoop lock may, for example, also have a flexible hoop and be designed as a cable lock, a chain lock or a jointed bar lock (also called a folding lock). For example, a lockout padlock may also have a wire rope hoop.

Further embodiments can be seen from the dependent claims, the description, and the Figures.

In some embodiments, the replacement opening may be arranged at a lower side of the lock body opposite the lock hoop.

In some embodiments, the cover may have a closing plate that is oriented perpendicular to the plug-on direction and that, when the cover is plugged onto the housing, extends along a plane of extent of the replacement opening. Furthermore, the cover may have a plug-on collar that adjoins the closing plate and that extends peripherally around the closing plate in the plug-on direction. In some embodiments, the plug-on collar may be configured to cooperate with the at least one sealing section of the housing, whereas, in other embodiments, the plug-on collar may have the at least one sealing section.

Thus, it may be provided that the cover has a closing plate that covers and thereby closes the replacement opening when the cover is plugged on. In particular, the closing plate may be oriented perpendicular to the plug-on direction. Furthermore, the cover may have a plug-on collar that adjoins the closing plate and that may, for example, be introducible into an inner space of the housing in order, as a result, to plug the cover onto the housing. Alternatively thereto, the plug-on collar may, however, also be pushed onto the outside of the housing, for example.

Since the peripheral plug-on collar may thus be arranged opposite a side wall of the housing when the cover is plugged onto the housing, the sealing section may in particular be arranged at the plug-on collar to be compressed and/or elastically deformed by a side wall of the housing, or the plug-on collar may cooperate with a sealing section formed at a side wall of the housing to compress and/or elastically deform this sealing section.

In some embodiments, the housing may have the at least one sealing section and the plug-on collar may be configured to cooperate with the at least one sealing section in order to seal the replacement opening.

In such embodiments, the sealing section may in particular extend, starting from the side wall of the housing, up to and into a movement path described by the plug-on collar when plugging on the collar to be able to be contacted by the plug-on collar during the plugging on of the cover and, as a result, to be able to be elastically deformed and/or compressed.

In some embodiments, the at least one sealing section may extend from the side wall of the housing into an inner space of the housing.

In such embodiments, it may furthermore be provided that the plug-on collar of the cover may be introduced into the inner space of the housing to be able to cooperate with the sealing section arranged at the housing and to be able to seal the inner space of the housing by compressing and/or elastically deforming the at least one sealing section.

In some embodiments, the entire housing may be elastically deformable. For this purpose, the housing may in particular be made of silicone in some embodiments.

In such embodiments, the housing may therefore in particular not be a rigid housing and/or a housing that significantly secures the lock body against break-open attempts, but may so-to-say form a flexible sleeve surrounding the energy source and/or a flexible battery compartment for sealed storage of the energy source and/or a battery in the hoop lock. As explained in more detail below, the housing may therefore in particular form an inner sleeve of the lock body and be surrounded by a rigid outer housing to achieve a sufficient stability of the hoop lock or the lock body.

However, such an elastically deformable design of the housing overall makes it possible to configure the sealing section directly as a housing section, for example, and not to fasten it to the housing as a separate component, for instance. Rather, the elastically deformable housing, which may surround the energy source in a sealing manner, may be cleverly used to also directly form a sealing section for sealing the housing opening that is required to enable a replacement of the energy source.

In some embodiments, the at least one sealing section may be integrally formed in one piece with the housing.

An integrally single-piece component (here: housing with a sealing section) is to be understood as a component originally formed as a single bonded component and it may be manufactured by casting or injection molding, for example. A housing integrally formed in one part with the sealing section according to such an embodiment thus in particular differs from housings having sealing sections that are originally assembled from two or more parts (for example, a housing part and an attached sealing section part) and whose individual elements are connected to form a releasable or permanent joint connection, such as by welding, screwing or adhesive bonding.

Since, in some embodiments, the sealing section may be integrally formed in one piece with the housing, the sealing section and the housing may thus form such an integrally single-piece component so that the sealing section-in these embodiments-is not, for instance, only after the formation of the housing be connected to the housing and, for example, glued thereto. Therefore, in such embodiments, in particular the entire housing may be elastically deformable and/or may be made of the same material as the sealing section.

In general, the sealing section may further be made of silicone in some embodiments.

In some embodiments, the housing may surround the electric motor in a sealing manner.

In particular, in some embodiments, the housing may therefore form a sleeve for sealing the electronic components of the electromechanical locking mechanism to be able to seal the energy source, the electric motor and electrical lines leading from the energy source to the electric motor against external influences. The housing may further, in particular at a side facing away from the replacement opening, have a drive transmission opening at which a drive transmission element of the electromechanical locking mechanism and/or the latch element may project from the housing in a sealed manner to be able to selectively lock the lock hoop.

In some embodiments, the hoop lock may comprise a radio receiver for receiving an unlocking command and/or a locking command via a radio connection and a control device that is configured to control the electromechanical locking mechanism to release the introduced lock hoop for a detachment from the lock body in response to a received unlocking command and/or to control the electromechanical locking mechanism to lock the introduced lock hoop in response to a received locking command. For example, such a radio receiver may enable a communication with a smartphone via a radio connection, such as a mobile radio connection, a WLAN/WiFi connection and/or a Bluetooth connection. Alternatively or additionally, in some embodiments, the hoop lock may have a sensor for detecting the hoop introduced into the lock body and a control device of the hoop lock may be configured to control the electromechanical locking mechanism to lock the lock hoop in response to a signal of the sensor.

In some embodiments, the housing may have a peripheral latching bead and, in such embodiments, a peripheral latch groove may be formed at the cover, wherein the latching bead may engage into the latch groove when the cover is plugged on.

In particular, the peripheral latching bead may be formed at a side wall of the housing and the latch groove may be formed at a side wall of the cover facing the latching bead, in particular at the aforementioned plug-on collar. Furthermore, the latching bead may be configured as extending, starting from the side wall of the housing, in particular into an inner space of the housing to be able to engage into the latch groove. In particular, such a latching bead may be provided in embodiments in which the at least one sealing section is also formed at the housing. In embodiments in which the housing has the at least one sealing section, the latching bead may further in particular be arranged at the same side wall as the at least one sealing section.

Due to such an engagement of the latching bead into the latch groove, the cover may in particular be secured against a release from the housing against the plug-on direction, for which purpose the latch groove may, for example, have an undercut with which the latch groove engages behind the latching bead. Furthermore, the latching bead may in particular be elastically deformable to be elastically deformed during a plugging of the cover onto the housing, but to be able to expand against the elastic deformation and engage into the latching bead after a complete plugging on of the cover. Furthermore, in some embodiments, the latching bead may be integrally formed in one piece with the housing.

However, it is generally also possible that the latching bead is formed at the cover, in particular the aforementioned plug-on collar, and that the housing has a latch groove into which the latching bead formed at the cover engages when the cover is plugged on. This may in particular be provided in embodiments in which the at least one sealing section is formed at a side wall, in particular the plug-on collar, of the cover.

In some embodiments, the latching bead may be arranged at an end section of the housing facing the replacement opening. In such embodiments, the latch groove may further be formed at a section of a plug-on collar of the cover surrounding the closing plate, said section adjoining a closing plate of the cover. In such embodiments, the cover may therefore be secured directly in the region of the replacement opening against a release from the housing against the plug-on direction by the engagement of the latching bead into the latch groove.

In some embodiments, the housing may form a flexible inner sleeve of the padlock and the padlock may have a rigid outer housing which surrounds the housing and at which the housing is supported.

A housing configured as a flexible inner sleeve may in particular be elastically deformable so that the housing may serve to seal the energy source but without giving the padlock the required stability or representing break-open protection. In particular, such a housing may therefore serve to seal the energy source against liquid entering the outer housing.

Since the housing may be supported at the rigid outer housing, an outwardly directed force transmitted from the cover to the housing via the sealing section may be absorbed by the rigid outer housing in order thereby to prevent an outward displacement of the housing and to achieve the desired sealing. Since the housing is flexible and/or elastically deformable in such embodiments, the housing may in particular have the at least one sealing section and/or be integrally formed in one piece with the sealing section in embodiments in which the housing forms a flexible inner sleeve.

The outer housing may furthermore have a housing opening that surrounds the replacement opening. In this regard, the outer housing may also have an opening to allow a removal and/or insertion of the energy source form and/or into the housing.

Furthermore, in some embodiments, it may be provided that an end section of the housing is clamped between a plug-on collar of the cover and the outer housing. In particular, the end section may therefore be urged outwards against the outer housing when the cover is plugged on and may therefore be stably supported at the outer housing in the assembled state of the padlock.

In some embodiments, the outer housing may have a housing opening that surrounds the replacement opening and that is bounded by a peripheral marginal section, wherein the housing may extend against the plug-on direction beyond the outer housing and may engage over the marginal section, in particular radially outwardly.

The housing may in particular be fixed relative to the outer housing with regard to movements along the plug-on direction by such an engagement over the marginal section. Furthermore, the engagement over the marginal section may make it possible to secure sections of the housing projecting towards the replacement opening against movements transverse to the plug-on direction and to keep the housing, which is in particular flexible and/or elastically deformable, in the intended form.

Furthermore, in such embodiments, the cover may in particular rest on a section of the housing that engages over the marginal section of the outer housing. In particular in embodiments in which the entire housing is elastically deformable, a further sealing of an inner space of the housing may therefore also be achieved by such a resting of the cover at the housing (said cover thus at least does not rest completely at the rigid outer housing).

In some embodiments, the housing may have, at an outer side, an elevated support portion that engages into a support recess of the outer housing. In particular, the housing may be introducible into an inner space of the outer housing in the course of an assembly of the hoop lock, wherein the engagement of the elevated support portion into the support recess may indicate a correct positioning of the housing in the outer housing and may stabilize the housing in the outer housing. The assembly of the hoop lock may hereby in particular be facilitated, wherein such a configuration of the outer housing with a support recess, through which access to the housing is possible, is again unproblematic in particular in lockout applications since hoop locks or padlocks used in this way do not have to offer break-open protection against theft attempts or break-in attempts.

In some embodiments, the outer housing and/or the lock hoop may be made of an electrically non-conductive material and in particular of plastic.

In particular if the padlock is used as a lockout padlock, a non-conductive design of the components of the hoop lock that come into mechanical contact with the switch or the detent may be provided to prevent any electrical current flow through the hoop lock. Furthermore, when used as a lockout padlock, a design of the outer housing and/or the lock hoop, for instance, of plastic is unproblematic since the padlock does not have to withstand any break-open attempts. A configuration of the hoop lock with an outer housing and/or lock hoop made of plastic may further enable a lighter design of the hoop lock compared to the use of metal components so that the taking along of a plurality of hoop locks, as is again in particular often necessary with lockout padlocks, may also be conveniently possible. Furthermore, plastic outer housings and/or plastic lock hoops may easily be manufactured in different colors, for example, to be able to easily identify different types of lockout padlocks or lockout padlocks provided for different system components.

In some embodiments, a rigid holder for holding the energy source may be arranged in the housing, wherein in particular a spring for tensioning the energy source in the holder may be arranged at the holder. Furthermore, the electric motor may also be held at the holder in some embodiments.

In particular, such a holder may be provided in embodiments in which the entire housing is elastically deformable to enable a precise and stable support of the energy source and/or the electric motor. The housing may in particular be arranged surrounding the holder so that an inner space of the holder may also be reliably sealed as a result of the plugging of the cover onto the housing. For example, the holder may be made of metal or plastic.

Furthermore, in some embodiments, the housing may have a housing support edge extending in an inner space of the housing and the holder may have an outwardly extending holder support edge. In such embodiments, the holder may be supported with the holder support edge along the plug-on direction at the housing support edge. Furthermore, in such embodiments, the housing—viewed in reverse—may be supported with the housing support edge against the plug-on direction at the holder support edge.

In such embodiments, it may, for example, be provided that the holder is fixed relative to the outer housing with respect to movements against the plug-on direction so that the housing may also be fixed against movements against the plug-on direction by supporting the housing at the holder support edge. Furthermore, the holder (in particular with the elements held thereat) may be insertable into the housing, for example during an assembly of the hoop lock, wherein the housing support edge may form an abutment for the holder or the holder support edge in order to indicate a correct positioning of the holder and thus in particular also of the elements held thereat. The housing may then, for example, be inserted into an outer housing of the hoop lock to thereby be able to correctly position all the components within the outer housing in a single assembly step.

In some embodiments, the cover may have at least one support section that extends into the housing when the cover is plugged on and that is configured to secure the energy source against a movement opposite the plug-on direction.

For example, two support sections may be provided which extend from a closing plate of the cover towards the energy source and which the energy source may contact when the cover is plugged on so that the energy source may be secured by the cover against a movement opposite the plug-on direction. Such support sections may, for instance, be designed as flat support surfaces, wherein the support section may alternatively or additionally have, at a contact section facing the energy source, a shape adapted to a shape of the energy source and/or may be curved, for example.

In some embodiments, the sealing section may be configured as a peripheral sealing lip. In particular, in some embodiments, it may therefore be provided that the housing has at least one peripheral sealing lip at a side wall.

In some embodiments, two peripheral sealing sections arranged offset from one another along the plug-on direction may be provided at the housing or the cover. In particular, the sealing sections may be formed in the same way so that two sealing lips arranged offset from one another in the plug-on direction may be formed at the housing or the cover, for example. Here, a sealing section facing the replacement opening may, for example, act as dust protection and as a first liquid protection, whereas a sealing section facing away from the replacement opening may be provided primarily as further liquid protection.

In some embodiments, the sealing section, the housing and/or the cover may be made of an acid-resistant material.

In particular, the sealing section, the housing and/or the cover may be configured as resistant to battery acid to prevent an escape of battery acid, possibly discharged by the energy source, from the housing. This may also in particular be important for applications in the field of occupational safety.

In some embodiments, the cover may be releasable from the housing without tools in the fully assembled state of the hoop lock. In such embodiments, it is therefore not necessary, starting from the fully assembled hoop lock, to use a tool, such as a screwdriver, to be able to release the cover from the housing and change the energy source. In such embodiments, the cover may therefore in particular be removable directly from the housing. Nevertheless, an unintentional release of the cover from the housing may be prevented by the static friction acting between the sealing section and a side wall of that element of the housing and the cover which does not have the sealing section and/or the cooperation of the aforementioned latching bead with the likewise mentioned latch groove may be prevented.

In some embodiments, no separate fastening device, in particular no screw, may be provided for fastening the cover to the housing. Alternatively or additionally, in some embodiments, no additional sealing device, in particular no sealing ring, may be arranged axially between the housing and the cover with respect to the plug-on direction.

In some embodiments, it may therefore rather be provided that the cover axially contacts the housing directly. As already explained, such an omission of additional sealing devices may also be made possible in that the sealing does not take place axially with respect to the plug-on direction, but transversely to the plug-on direction by the sealing section extending from the side wall so that in particular no force acting in the direction of the plug-on direction for deforming a sealing element has to be generated in order to seal the housing. However, in particular with an elastically deformable design of the housing, a certain sealing in the axial direction may be achieved even in the case of such a direct contact of the cover with the housing.

In some embodiments, respective handle depressions may be formed at the lock body laterally next to the replacement opening at mutually oppositely disposed sides to remove the plugged-on cover from the housing. In particular, the housing and/or the outer housing of the hoop lock may have respective lateral handle recesses and the cover, in particular a closing plate of the cover, may have handles that extend laterally over the handle recesses so that a handle depression is formed. This makes it possible to grip beneath the handles of the cover and to develop a pressure directed opposite to the plug-on direction on the closing plate to be able to easily release the cover from the housing and gain access to the energy source.

DRAWINGS

The invention will be explained in the following purely by way of example with reference to an embodiment and to the drawings. There are shown:

DETAILED DESCRIPTION OF THE INVENTION

Figure 1:
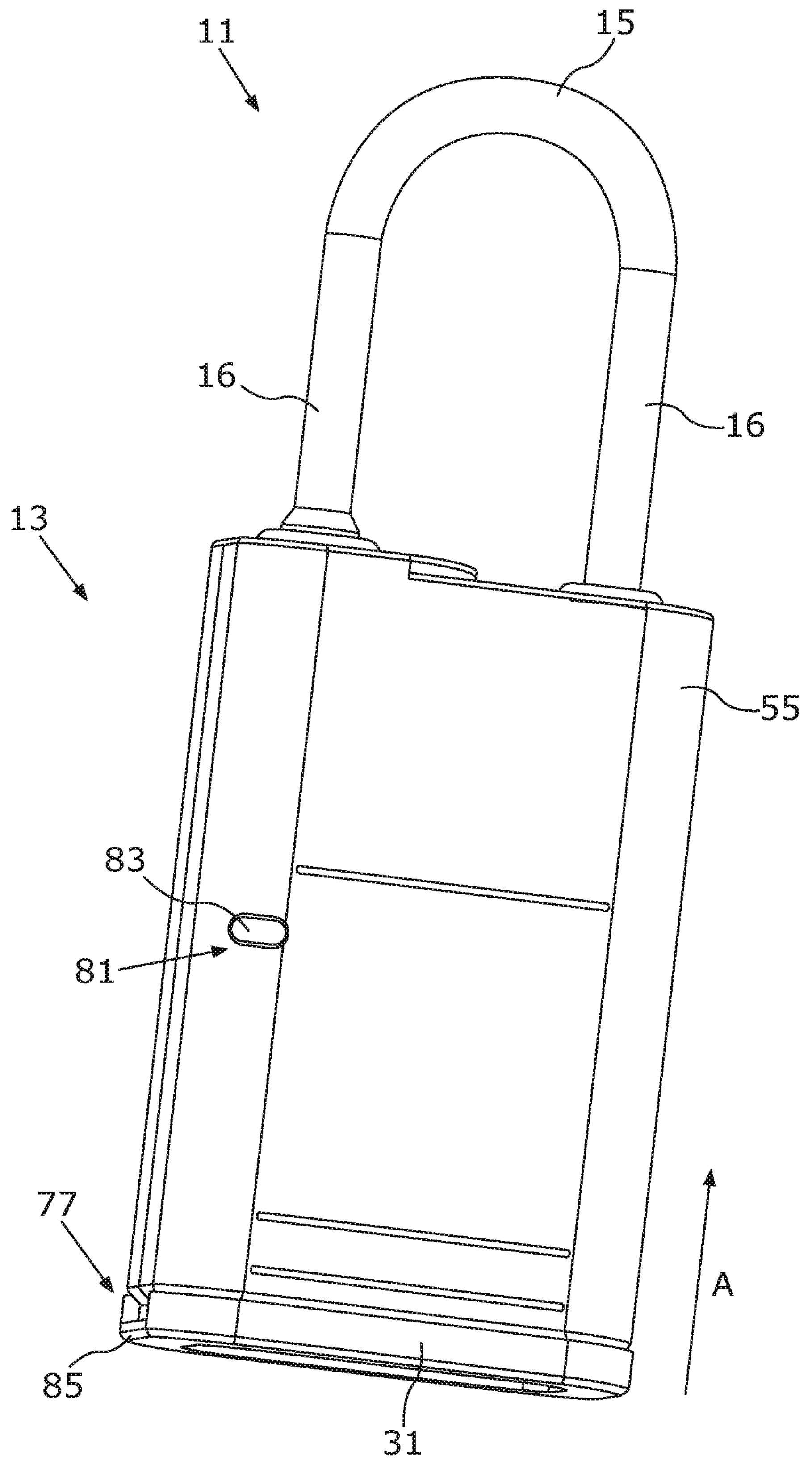
FIG. 1 is a perspective representation of a portable hoop lock that is configured as a padlock and in particular as a lockout padlock.

FIG. 1 shows a hoop lock 11 that has a lock body 13 and a lock hoop 15 that may be locked thereto and that may be at least partly detached from the lock body 13. By way of example, the hoop lock 11 is shown as a padlock whose lock hoop 15 is configured as a rigid and substantially U-shaped U-hoop having two limbs 16 that, in order to lock the hoop lock 11, may be introduced into an outer housing 55 of the hoop lock 11 and may be locked there by means of an electromechanical locking mechanism 17 (cf. also FIGS. 4 and 5 with respect to the locking mechanism 17).

Figure 4:
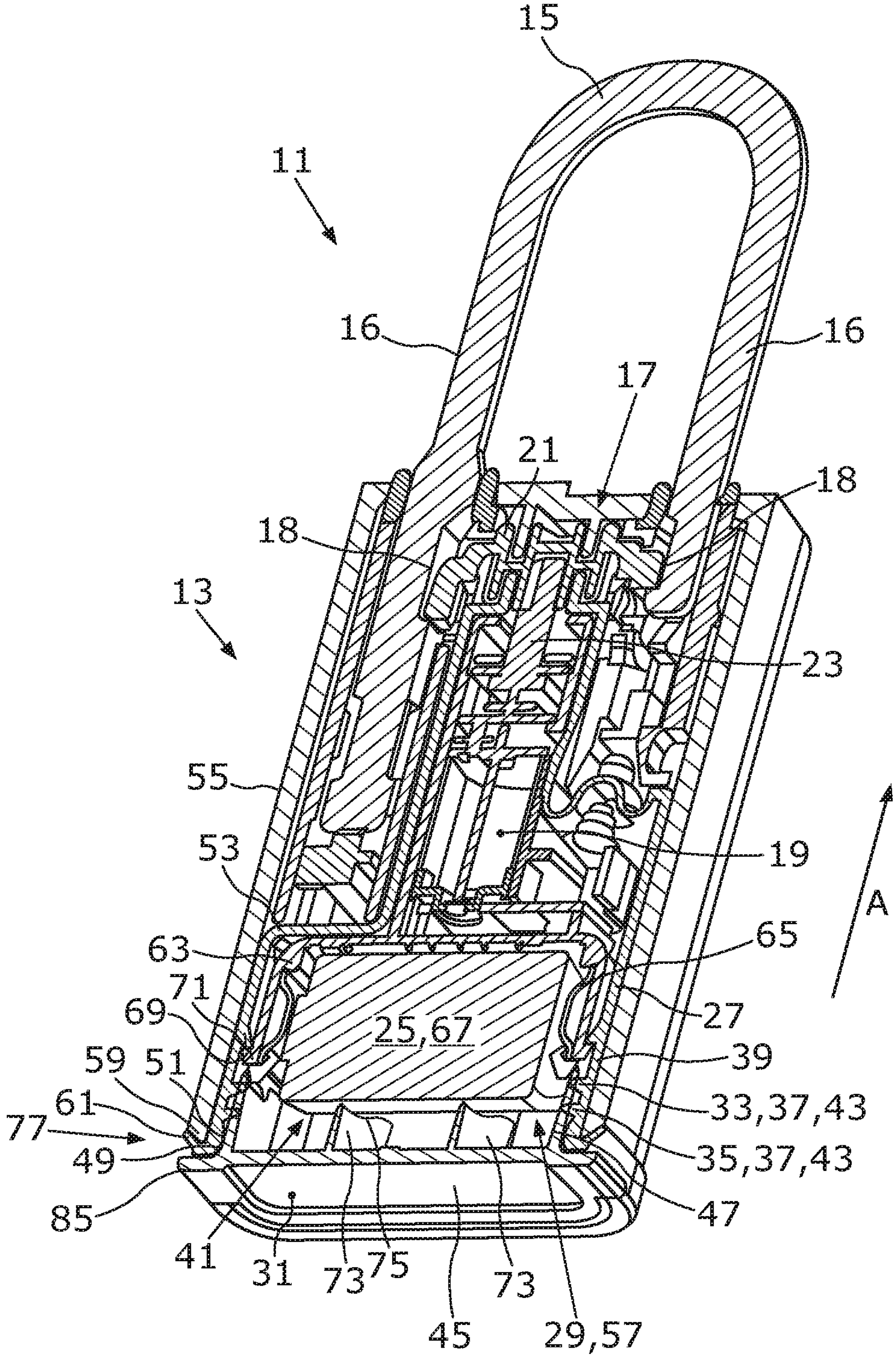
FIG. 4 is a sectional representation of the hoop lock.
Figure 5:
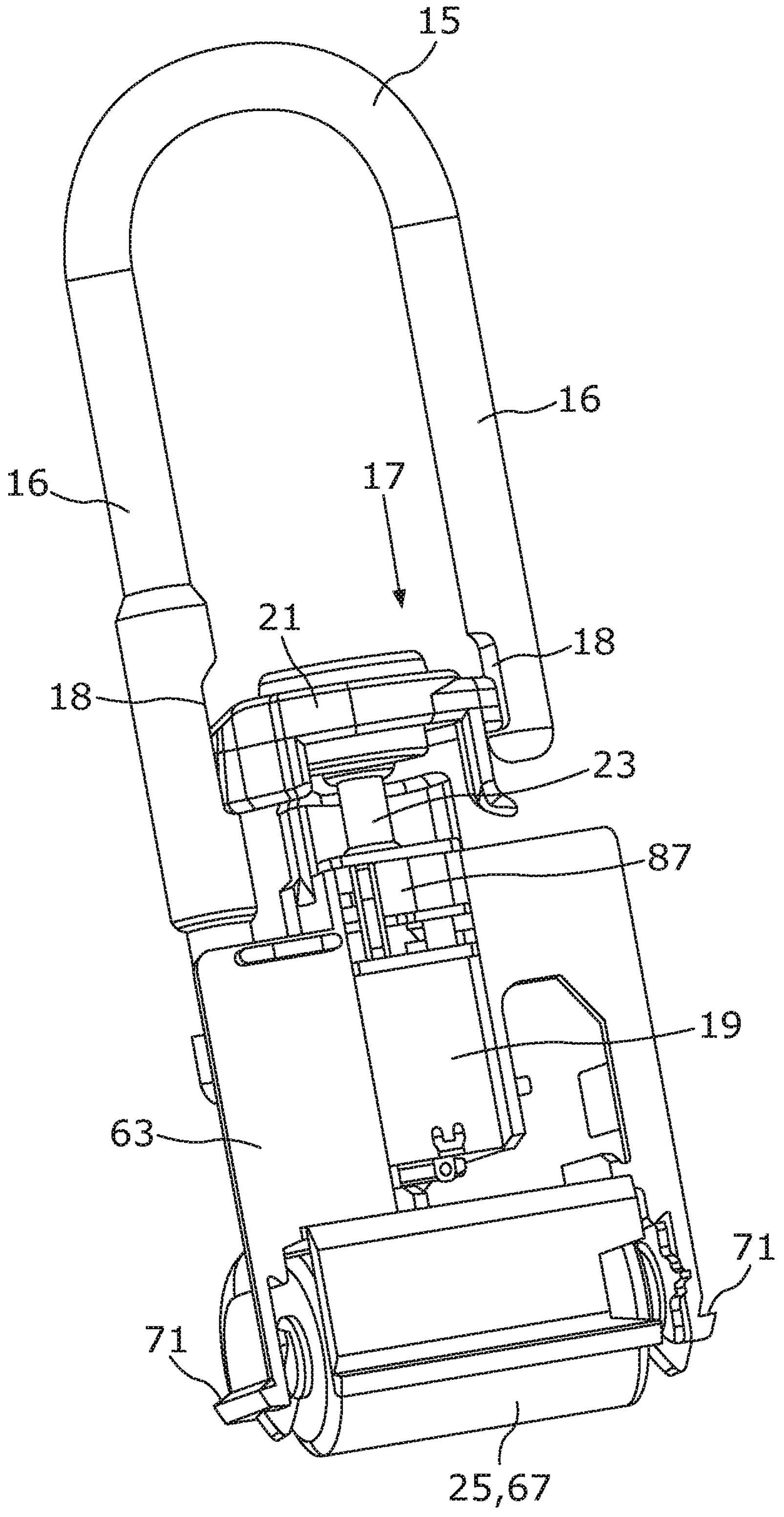
FIG. 5 is a perspective view of an electromechanical locking mechanism of the hoop lock that has an energy source that is configured as a battery and that is held at a holder.

As can in particular be seen from FIGS. 4 and 5, the lock hoop 15 has a long limb 16 and a short limb 16, wherein it may, for example, be provided that the short limb 16 may be selectively removed (or detached) from the lock body 13 for opening the hoop lock 11, whereas the long limb 16 may remain in the lock body 13 even when the hoop lock 11 is open. Alternatively thereto, it may also be provided that the released lock hoop 15 may be completely removed (or detached) from the lock body 13.

The design of the aforementioned electromechanical locking mechanism 17 is in particular visible in FIG. 5. Accordingly, the electromechanical locking mechanism 17 has an electric motor 19 that is connected to an energy source 25 configured as a battery 67 and that is connected to a rotatable latch element 21 via a gear 87 and a drive transmission element 23. In the locked position of the lock hoop 15 shown in the Figures, the latch element 21 engages into respective notches 18 of the limbs 16 and thereby secures the limbs 16 against a release from the lock body 13, wherein the latch element 21 may, however, be rotated by appropriate control of the electric motor 19 into an unlocking position, not shown in the Figures, in which at least the short limb 16 may be released from the lock body 13. For example, the hoop lock 11 may have a radio receiver, likewise not shown in the Figures, for receiving an unlocking command, which may, for instance, be transmitted to the radio receiver by a smartphone via a radio connection (e.g. a mobile radio connection, a WLAN/WiFi connection and/or a Bluetooth connection), and the hoop lock 15 may have a control device that is configured to drive the electric motor 19 to drive the latch element 21 and to release the lock hoop 15 in response to the unlocking command. Furthermore, the control device may, for example, also be configured to control the electric motor 19 to drive the latch element 21 into the locking position and to lock the introduced lock hoop 15 in response to a locking command received at the radio receiver.

In general, such an electromechanical locking mechanism 17 may thus enable a simple operation of the hoop lock 11 in that no mechanical key has to be taken along to be able to open and/or lock the hoop lock 11. However, in order to actuate the electromechanical locking mechanism 17, it is necessary for the energy source 25 to supply the electric motor 19 with electrical energy so that, for example, it must be possible to replace an exhausted energy source 25 with a new and charged energy source 25 or a new battery 67.

Figure 2:
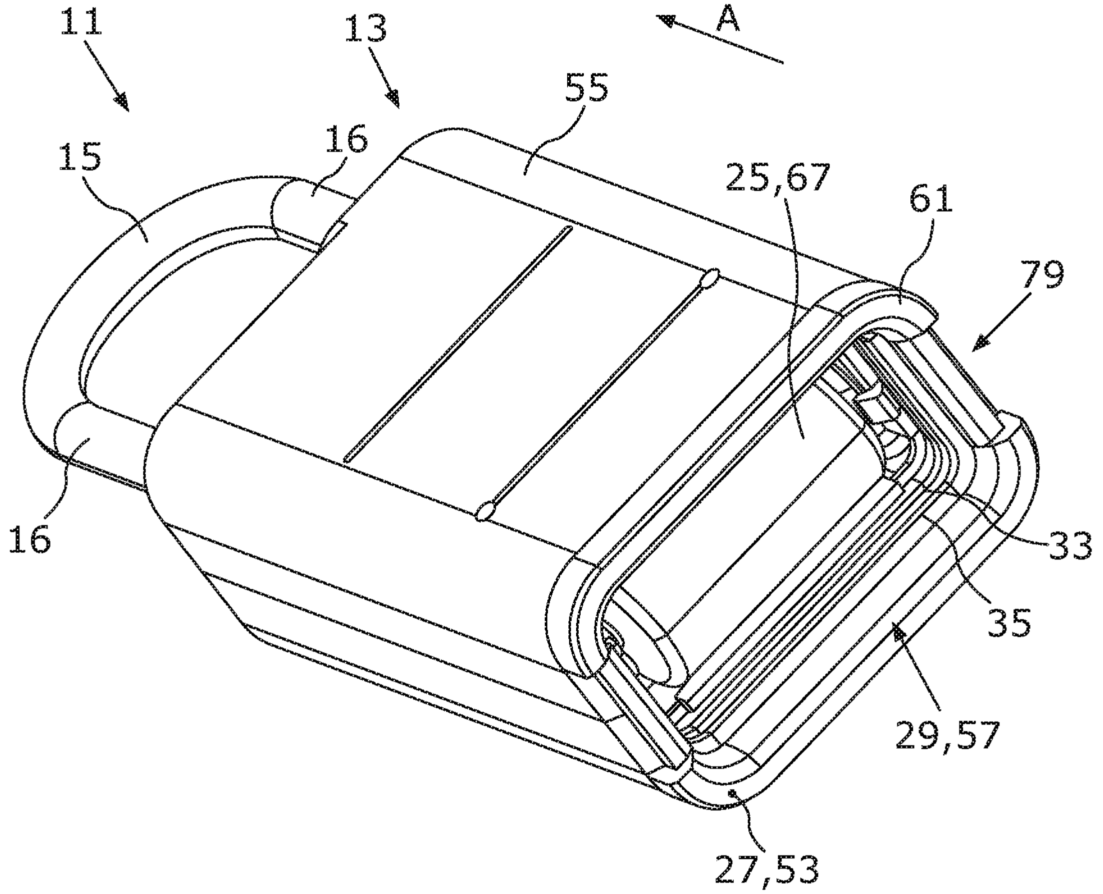
FIG. 2 is a perspective representation of a lower side of the padlock, wherein a cover for closing a replacement opening of a housing of the hoop lock and a housing opening of an outer housing of the hoop lock is removed.

To enable such a replacement of an exhausted energy source 25, the outer housing 55 is open at a lower side of the hoop lock 11 opposite the lock hoop 15 and has a housing opening 57 that is bounded by a marginal section 59 (cf. FIGS. 2 and 4). Furthermore, a housing 27 configured as a flexible and elastically deformable inner sleeve 53 is arranged within the outer housing 55 and has a replacement opening 29 through which the energy source 25 or the battery 67 may be selectively introduced into an inner space 41 of the housing 27 or removed from the housing 27. The housing 27 therefore so-to-say forms a battery compartment into which the energy source 25 is inserted.

While the replacement opening 29 thus enables access to the energy source 25 and a replacement of the energy source 25, the hoop lock 11, as shown for example in FIG. 1, has a cover 31 that is configured to selectively close the replacement opening 29 and to achieve a sealing of the inner space 41 of the housing 27 against liquid and/or dirt.

Figure 3A:
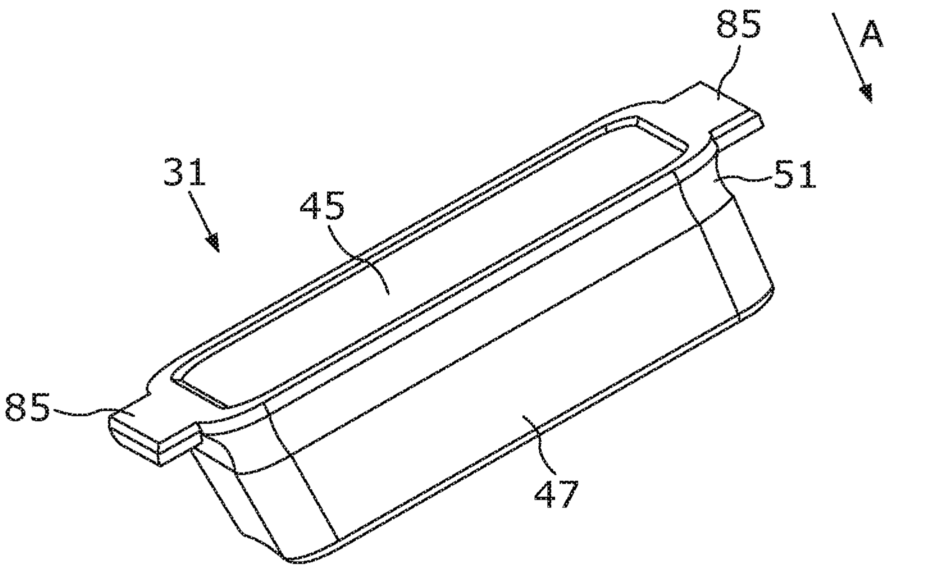
FIGS. 3A and 3B are respective perspective representations of the cover.
Figure 3B:
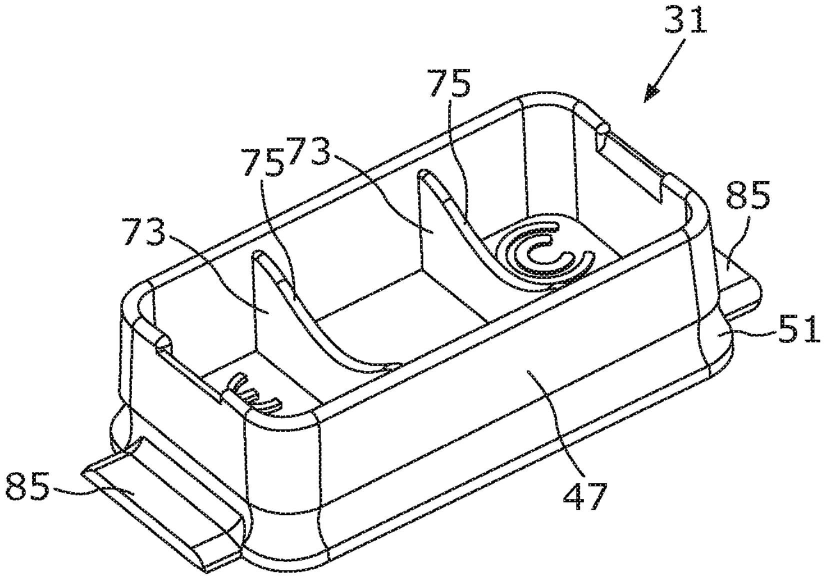

This cover 31 is in particular illustrated by means of FIGS. 3A and 3B and is configured to be plugged onto the housing 27 along a plug-on direction A in order to close and seal the replacement opening 29. The cover 31 has a closing plate 45 that extends perpendicular to the plug-on direction A and that, in the plugged-on state of the cover 31, extends in a plane of extent of the replacement opening 29 and closes the replacement opening 29. Furthermore, the cover 31 has a plug-on collar 47 that adjoins the closing plate 45 and that extends peripherally around the closing plate 45 in the plug-on direction A. The plug-on collar 47 is configured to be introduced into the inner space 41 of the housing 27 in the plug-on direction A and thus to be plugged, so to speak, into the housing 27 and the outer housing 55 of the hoop lock 11 in order, as a result, to plug the cover 31 onto the housing 27.

Furthermore, two support sections 73 are formed at the cover 31 that extend along the plug-on direction A and that extend towards the energy source 25 in the plugged-on state of the cover 31, that have contact sections 75 adapted to the shape of the energy source 25 and that secure the energy source 25 against movements against the plug-on direction A in the plugged-on state of the cover 31 (cf. in particular FIGS. 3B and 4). Furthermore, the cover 31 has two handles 85 that extend at the closing plate 45 and that are provided to be able to selectively release the plugged-on cover 31 from the housing 27. A peripheral latch groove 51 is furthermore formed at the plug-on collar 47 to be able to secure the cover 31 axially at the housing 27 with respect to the plug-on direction A, as is explained in more detail below.

The cooperation of the cover 31 and the housing 27 for sealing the housing 27 will be explained below, in particular in connection with FIG. 4.

Figure 6:
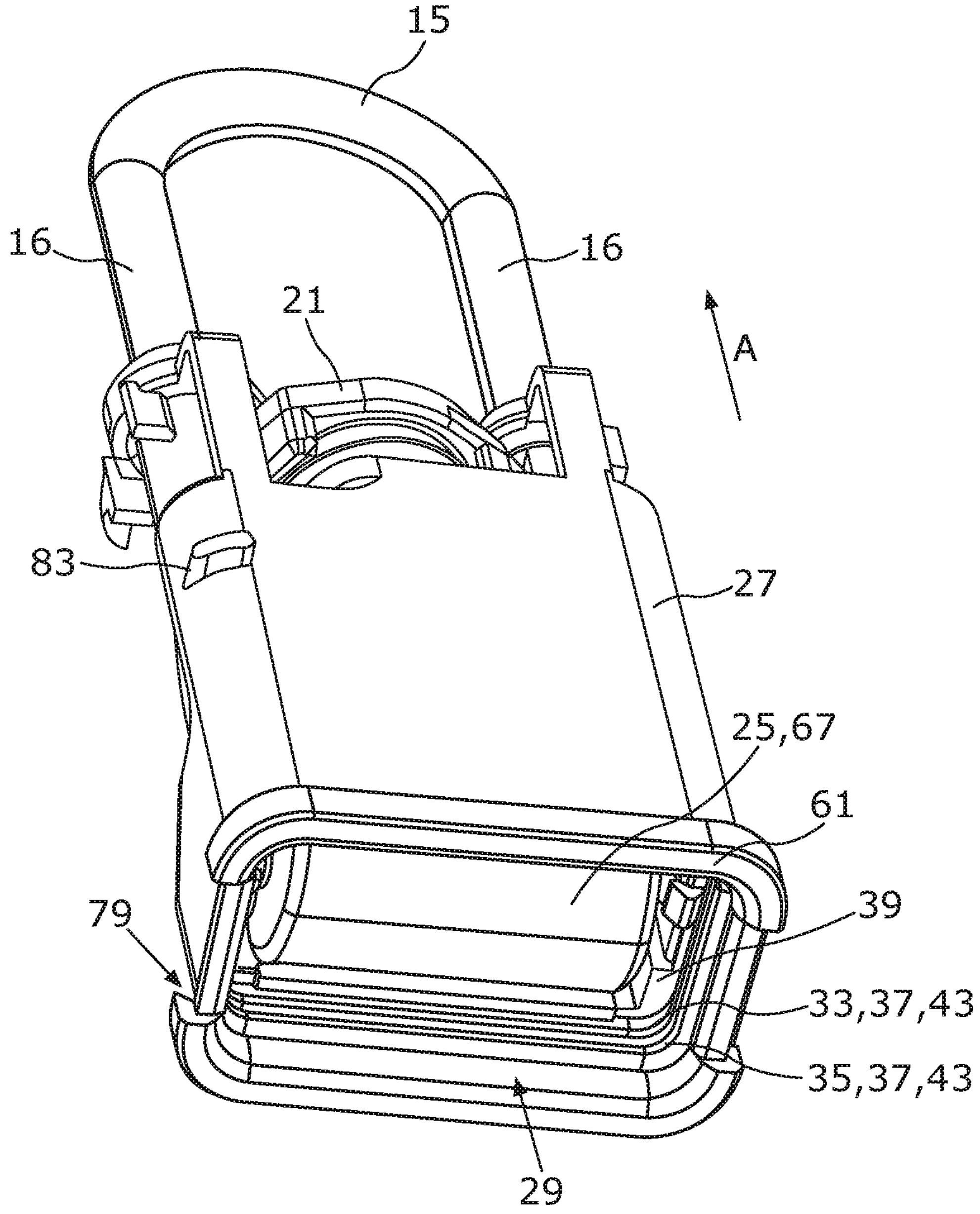
FIG. 6 is a perspective bottom view of the housing, which is configured as a flexible inner sleeve, of the hoop lock when the cover is removed.

For example, it can be seen from FIG. 4 that two peripheral sealing sections 33 and 35 are formed at a side wall 39 of the housing 27 and form respective elevated portions 43 at the side wall 39 that project into the inner space 41 of the housing 27 (cf. also FIGS. 2 and 6). In particular, the sealing sections 33 and 35 are furthermore arranged offset from one another in the plug-on direction A and form respective sealing lips 37 that extend into the inner space 41 of the housing 27.

The sealing sections 33 and 35 are further arranged such that the sealing sections 33 and 35 project into a movement path of the plug-on collar 47 which the plug-on collar 47 describes during a plugging of the cover 31 onto the housing 27. Therefore, the sealing sections 33 and 35 are contacted by the plug-on collar 47 during the plugging on of the cover 31. The sealing sections 33 and 35 are furthermore elastically deformable so that the sealing sections 33 and 35 are compressed by the plug-on collar 47 that is introduced further along the plug-on direction A into the inner space 41 of the housing 27 after reaching the sealing sections 33 and 35 and/or are elastically deformed along the plug-on direction A in order thereby to achieve a sealing of the inner space 41 of the housing 27.

Furthermore, the sealing sections 33 and 35 are, by way of example, integrally formed in one piece with the housing 27 so that in particular the entire housing 27 is elastically deformable and forms the aforementioned flexible inner sleeve 53 of the hoop lock 11. Moreover, in addition to the energy source 25, the housing 27 also surrounds the electric motor 19, the gear 87 and the drive transmission element 23 and the latch element 21 emerges from the housing 27 in a sealed manner so that the further electronic components of the hoop lock 11 may likewise be arranged protected from damage by incoming liquid in the sealed housing 27.

While the housing 27 is thus, by way of example, elastically deformable overall, the housing 27 is supported at the rigid and stable outer housing 55 at outer sides opposite the sealing sections 33 and 35 so that the housing 27 may not evade the movement of the plug-on collar 47 on a plugging on of the cover 31 and the aforementioned compression and/or elastic deformation of the sealing sections 33 and 35 takes place. When the cover 31 is plugged on, the sealing sections 33 and 37 therefore exert a force on the cover 31, and in particular on its plug-on collar 47, that is directed opposite to the experienced deformation and/or compression so that a slot between the side wall 39 of the housing 27 and the plug-on collar 47 may be closed and the inner space 41 of the housing 27 may be reliably sealed. The sealing therefore takes place in a radial direction with respect to the plug-on direction A and not—as with conventional solutions—in an axial direction so that the sealing may be achieved directly by plugging on the cover 31 and a sufficient axial force does not first have to be generated by fastening the cover 31 to the housing 27 and/or the outer housing 55 by means of a separate fastening device, such as a screw. Such an additional fastening device may therefore be omitted for the hoop lock 11 shown here.

In this regard, the hoop lock 11 disclosed here enables a secure and reliable sealing of the inner space 41, wherein, however, access to the inner space 41, for example to replace an exhausted or consumed energy source 25, may nevertheless be easily achieved in that the cover 31 may be removed without tools by simply pulling it off the housing 27.

To facilitate such a removal of the cover 31 even further, the aforementioned handles 85 are provided at the cover 31, wherein handle depressions 77 are furthermore formed at the outer housing 55. These handle depressions 77 make it possible to grip behind the plugged-on cover 31 at both sides at the handles 85 and to pull it off the housing 27 in this way. In particular, in the embodiment shown, the handle depressions 77 are formed by handle recesses 79 that are provided at the housing 27 and that are arranged at a section 61 of the housing 27 engaging over the aforementioned marginal section 59 of the outer housing 55 (cf. FIG. 4 for the engagement over the marginal section 59 by the engaging-over section 61 and FIGS. 2 and 6 for the formation of the engaging-over section 61). Due to the section 61 of the housing 27 engaging over the marginal section 59, the cover 31 furthermore also axially contacts the housing 27 and thus an elastically deformable section, wherein this axial contact of the cover 31 with the housing 27 may also contribute to a reliable sealing of the inner space 41 of the housing 27.

In addition to sealing the inner space 41, the cooperation between the plug-on collar 47 and the sealing sections 33 and 35 also makes it possible to secure the cover 31 against an unintentional release from the housing 27 against the plug-on direction A since the static friction acting between the plug-on collar 47 and the sealing sections 33 and 35 must be overcome for this purpose. Furthermore, a latching bead 49 is provided at the housing 27 and likewise extends peripherally at the side wall 39 of the housing 27 into the inner space 41 and engages into the aforementioned latch groove 51 of the cover 31 when the cover 31 is plugged on in order, in addition, to be able to hold the cover 31 axially at the housing 27 with respect to the plug-on direction A and to be able to secure it against an unintentional release from the housing 27 (cf. in particular FIG. 4).

Furthermore, FIGS. 4 and 5 in particular illustrate that the hoop lock 11 has a rigid holder 63 for holding the energy source 25, at which holder in particular a spring 65 for tensioning the energy source 25 is arranged. Furthermore, the electric motor 19, the gear and the drive transmission element 23 are also supported at the rigid holder 63. The holder 63 has two outwardly extending holder support edges 71 (cf. in particular FIG. 5) that contact housing support edges 69 formed at the housing 27 in the plug-on direction A (cf. FIG. 4). In particular, the holder 63 with the components held thereat may be inserted into the inner space 41 of the housing 27 during the assembly of the hoop lock 11 so that the housing support edges 69 may form an axial abutment for the holder 63 to indicate its correct positioning.

FIG. 6 again illustrates the housing 27 or the flexible inner sleeve 53, wherein in particular the replacement opening 29 and the peripheral sealing sections 33 and 35 at the side wall 39 of the housing 27 are recognizable. Furthermore, FIG. 6 shows that the housing 27 has, at an outer side, an elevated support portion 83 that, as FIG. 1 shows, engages into a support recess 81 formed at the outer housing 55 in the assembled state of the hoop lock 11 and thereby secures the housing 27 axially in the outer housing 55 with respect to the plug-on direction A. In particular, in the course of the assembly of the hoop lock 11, it can therefore be provided to first insert the components arranged within the housing 27 into the housing 27 in order thereupon to insert the housing 27 with the components already pre-assembled therein into the outer housing 55 in a single assembly step and to position the housing 27 such that the elevated support portion 83 engages into the support recess 81.

In summary, a reliable sealing of the inner space 41 may thus be achieved in the hoop lock 11 shown without having to resort to additional fastening devices or sealing devices, such as a sealing ring arranged axially between the cover 31 and the housing 27. The hoop lock 11 is in particular suitable for use as a lockout padlock by means of which a switch or a detent of an industrial system must be blocked during surviving work to prevent an unintentional starting of the system and a resulting danger for the maintenance personnel. With such hoop locks 11, unsecured access to the energy source 25 is basically unproblematic since the hoop locks 11 are not used as theft protection or break-open protection, but merely as a barrier against an unintentional starting of a system and/or an unintentional opening of a fluid line, for example. Conversely, however, a reliable sealing of the housing 27 is required precisely in such an environment and may be achieved by the two peripheral sealing sections 33 and 35 and the contact of the cover 31 with the section 61 of the flexibly and/or elastically deformable housing 27 that engages over the marginal section 59. In view of this application possibility, it may also be provided that the outer housing 55 and/or the lock hoop 15 is/are made of an electrically non-conductive material and in particular of plastic to achieve additional security when used as a lockout padlock as well as a lightweight design of the hoop lock 11 that allows a convenient taking along of the hoop lock 11 or of a plurality of such hoop locks 11 by the maintenance personnel. Furthermore, the housing 27, the cover 31 and/or the sealing sections 33 and 35 may in particular be made of a material that is resistant to battery acid to be able to reliably prevent an escape of battery acid in particular in such an environment of an industrial system. For example, the housing 27 and/or the sealing sections 33 and 35 may also be made of silicone.

The invention claimed is:

1. A portable hoop lock comprising:

a lock body and a lock hoop, wherein the lock hoop can be selectively introduced into the lock body or at least partly detached from the lock body and wherein the lock body comprises an electromechanical locking mechanism that is configured to selectively lock the lock hoop introduced into the lock body against a detachment from the lock body or to release the lock hoop for the detachment from the lock body, wherein the electromechanical locking mechanism has an electric motor, at least one latch element drivable by the electric motor and an energy source for supplying the electric motor with electrical energy, wherein the energy source is arranged in a housing that has a replacement opening through which the energy source can be introduced into the housing and removed from the housing, and wherein the hoop lock has a cover that can be plugged onto the housing along a plug-on direction to close the replacement opening, wherein the housing has at least one sealing section that forms an elevated portion at a side wall of the housing, wherein the elevated portion extends peripherally around the sidewall, wherein the at least one sealing section is elastically deformable, wherein the at least one sealing section can be at least one of compressed between the cover and the housing or elastically deformed along the plug-on direction by plugging on the cover onto the housing for sealing the replacement opening;

wherein the at least one sealing section is arranged such that the energy source can be removed from the housing without removing the at least one sealing section from the housing.

2. The portable hoop lock according to claim 1, wherein the cover has a closing plate that is oriented perpendicular to the plug-on direction and that, when the cover is plugged onto the housing, extends along a plane of extent of the replacement opening, and wherein the cover has a plug-on collar that adjoins the closing plate and that extends peripherally around the closing plate in the plug-on direction, wherein the plug-on collar is configured to cooperate with the at least one sealing section of the housing.

3. The portable hoop lock according to claim 2, wherein the plug-on collar is configured to cooperate with the at least one sealing section in order to seal the replacement opening.

4. The portable hoop lock according to claim 1, wherein the at least one sealing section extends from the side wall of the housing into an inner space of the housing.

5. The portable hoop lock according to claim 1, wherein the entire housing is at least one of elastically deformable or made of silicone.

6. The portable hoop lock according to claim 1, wherein the at least one sealing section is integrally formed in one piece with the housing.

7. The portable hoop lock according to claim 1, wherein the housing surrounds the electric motor in a sealing manner.

8. The portable hoop lock according to claim 1, wherein the housing has a peripheral latching bead and wherein a peripheral latch groove is formed at the cover, wherein the latching bead engages into the latch groove when the cover is plugged on.

9. The portable hoop lock according to claim 1, wherein the housing is an inner housing and forms a flexible inner sleeve of the hoop lock and wherein the hoop lock has a rigid outer housing which surrounds the inner housing and at which the inner housing is supported.

10. The portable hoop lock according to claim 9, wherein the outer housing has a housing opening that surrounds the replacement opening and that is bounded by a peripheral marginal section, wherein the inner housing extends against the plug-on direction beyond the outer housing and engages over the marginal section.

11. The portable hoop lock according to claim 9, wherein the inner housing has, at an outer side, an elevated support portion that engages into a support recess of the outer housing.

12. The portable hoop lock according to claim 9, wherein at least one of the outer housing or the leek hoop lock is made of an electrically non-conductive material.

13. The portable hoop lock according to claim 1, wherein a rigid holder for holding the energy source is arranged in the housing.

14. The portable hoop lock according to claim 13, wherein the housing has a housing support edge extending into an inner space of the housing and wherein the rigid holder has an outwardly extending holder support edge, wherein the rigid holder is supported with the holder support edge along the plug-on direction at the housing support edge.

15. The portable hoop lock according to claim 1, wherein the cover has at least one support section that extends into the housing when the cover is plugged on and that is configured to secure the energy source against a movement opposite the plug-on direction.

16. The portable hoop lock according to claim 1, wherein the at least one sealing section is configured as a peripheral sealing lip.

17. The portable hoop lock according to claim 1, wherein the at least one sealing section of the housing includes two peripheral sealing sections arranged offset from one another along the plug-on direction.

18. The portable hoop lock according to claim 1, wherein at least one of the at least one of the sealing section, the housing, or the cover are formed from an acid-resistant material.

19. The portable hoop lock according to claim 1, wherein the cover can be released from the housing without tools in the fully assembled state of the hoop lock.

20. The portable hoop lock according to claim 1, wherein at least one of:

no separate fastening device is provided for fastening the cover to the housing, or no additional elastically deformable sealing section is arranged axially between the housing and the cover with respect to the plug-on direction.

* * * * *